W. KLOCKE.
MANUFACTURE OF METAL LATHING.
APPLICATION FILED MAY 27, 1908.

928,610.

Patented July 20, 1909.
3 SHEETS—SHEET 1.

WITNESSES:
Fred White
René Bruine

INVENTOR:
William Klocke,
By Attorneys,

W. KLOCKE.
MANUFACTURE OF METAL LATHING.
APPLICATION FILED MAY 27, 1908.
928,610.
Patented July 20, 1909.
3 SHEETS—SHEET 3.
FIG. 6.
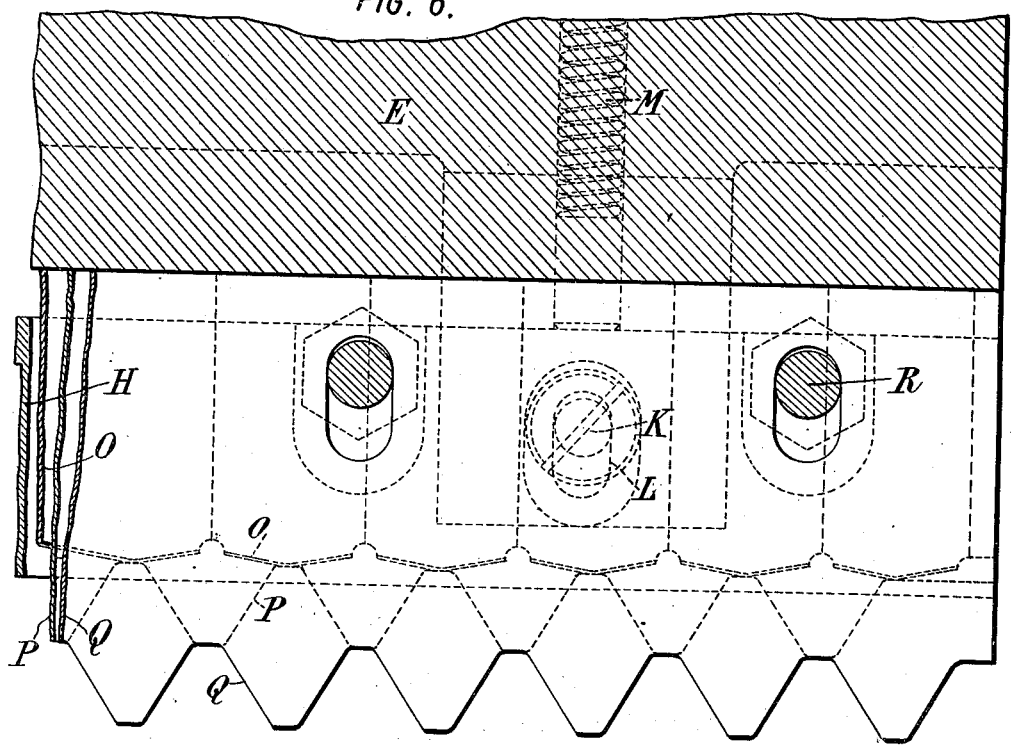
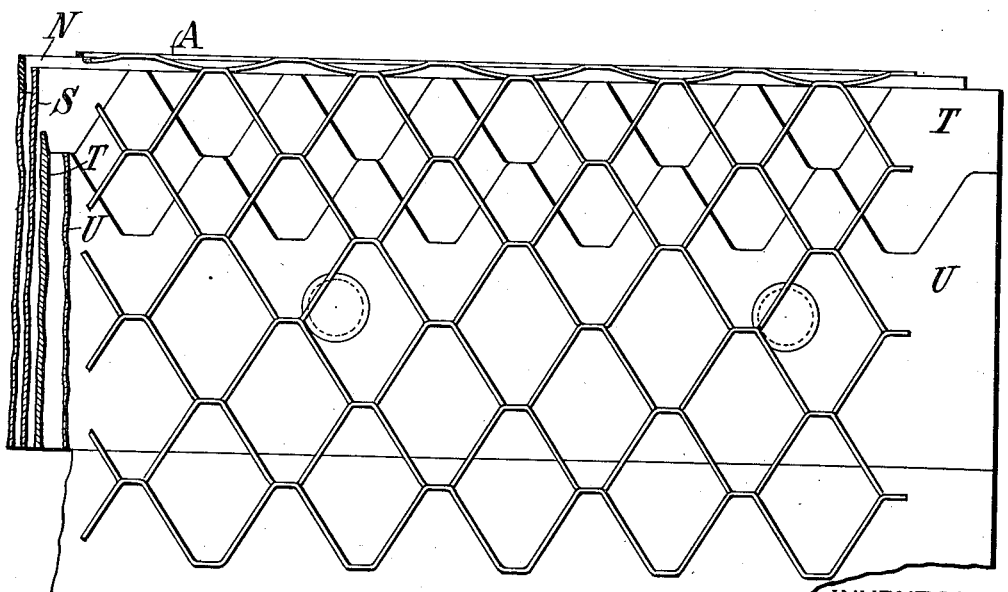
WITNESSES:
INVENTOR:
William Klocke,
By Attorneys,

UNITED STATES PATENT OFFICE.

WILLIAM KLOCKE, OF BROOKLYN, NEW YORK, ASSIGNOR TO E. W. BLISS COMPANY, OF BROOKLYN, NEW YORK, A CORPORATION OF WEST VIRGINIA.

MANUFACTURE OF METAL LATHING.

No. 928,610.     Specification of Letters Patent.     Patented July 20, 1909.

Application filed May 27, 1908. Serial No. 435,272.

*To all whom it may concern:*

Be it known that I, WILLIAM KLOCKE, a citizen of the United States, residing in the borough of Brooklyn, county of Kings, city and State of New York, have invented certain new and useful Improvements in Apparatus for the Manufacture of Metal Lathing, of which the following is a specification.

This invention aims to provide an improved apparatus for the manufacture of metal lathing, and especially lathing of the type known as expanded metal, made by punching and stretching a sheet to form successive sinuous lines staggered relatively to each other, so that the sheet is finally converted into a series of approximately hexagonal meshes in planes perpendicular to the plane of the sheet. Metal lathing cut and stretched according to other systems may also be produced by the use of this invention.

I propose to effect the cutting and the stretching or forming of the meshes in successive operations, using separate tools each of which is adapted to perform its function better and to be more durable than where a single punch is used to effect both the cutting and the stretching. I propose also to positively retain a line of finished meshes in shape while forming the following line of meshes, so as to avoid the distortion of the previously finished line which would otherwise occur. Preferably a compound die is used, having a cutter, a stretcher, and a retainer, arranged in such positions as to act simultaneously upon successive lines of the sheet to cut, stretch and hold in shape the work at each operation of the machine.

Other points of improvement are referred to in detail hereinafter.

The accompanying drawings illustrate embodiments of the invention.

Figure 1:
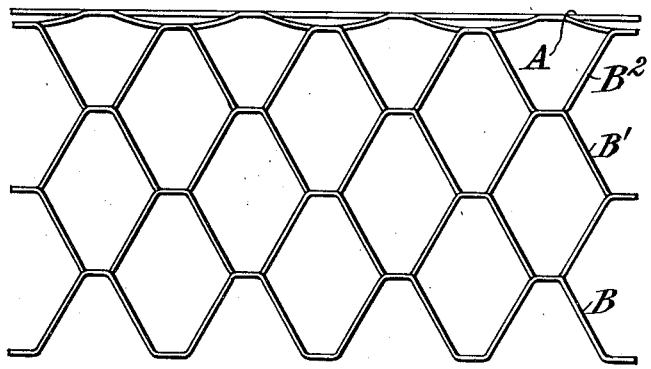
Figure 2:
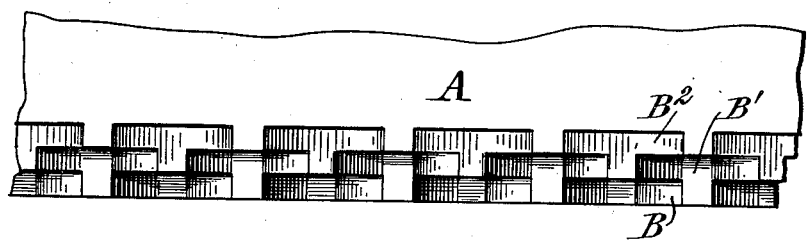
Figure 3:
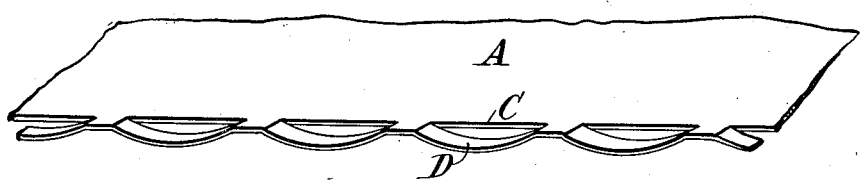
Figure 4:
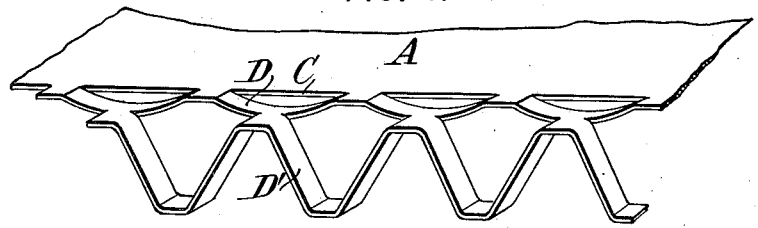
Figure 5:
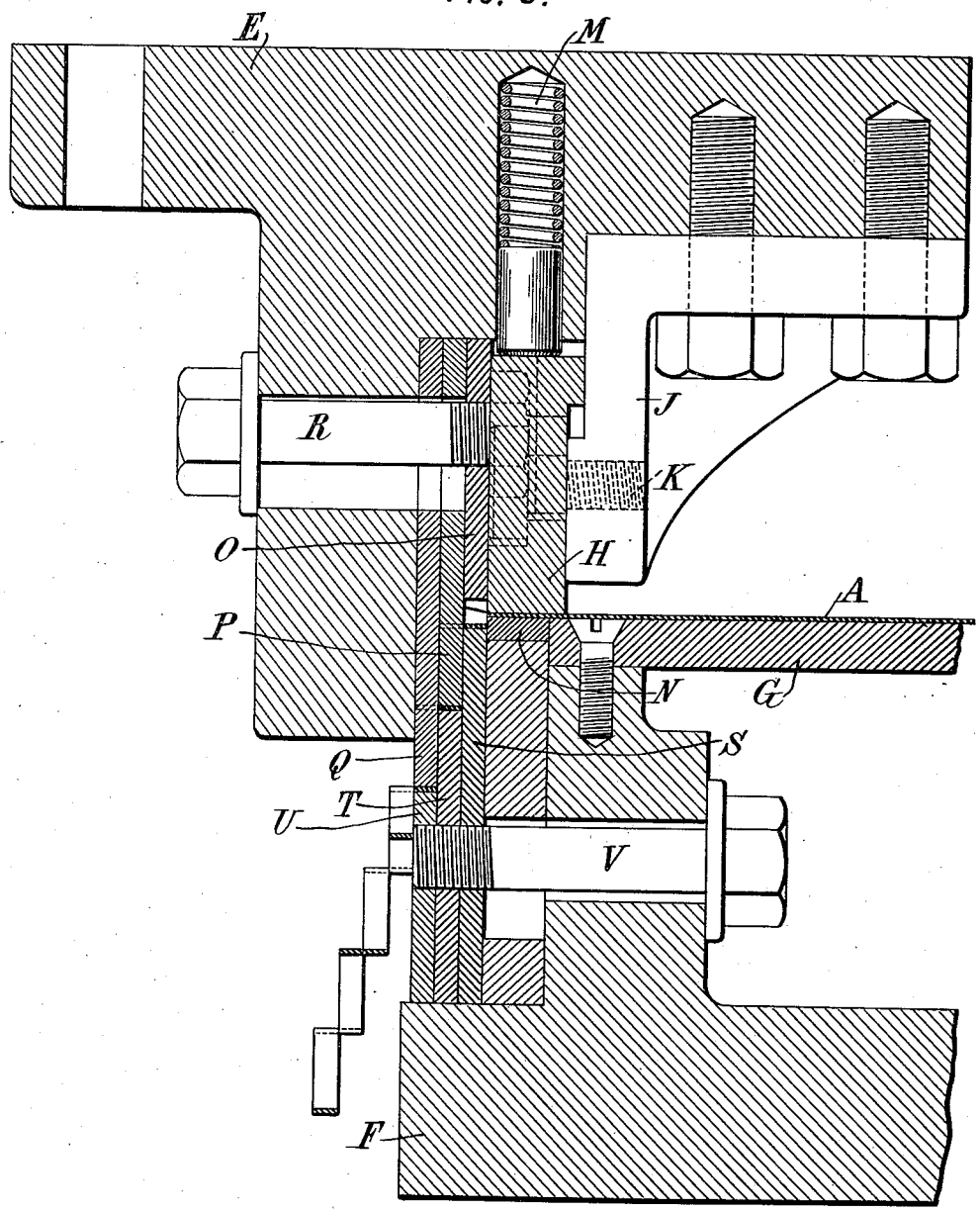

Figures 1 and 2 are respectively a face view and a plan of a sheet partly converted into expanded metal. Figs. 3 and 4 are perspective views illustrating successive steps of the process. Figs. 5 and 6 are a vertical section and a face elevation respectively of a suitable form of apparatus.

Referring to the drawings, the sheet of metal which is to be converted into expanded metal lathing is indicated at A. It is slitted and bent down as described to form lines B B' B² of the sinuous character indicated. The movement commences at the forward edge. After the formation of each sinuous line the sheet is fed a step forward and staggered alternately to the right and to the left, so that the successive sinuous lines are staggered relatively to each other and form the hexagonal meshes shown. Since the stretching of the metal is in a direction at right-angles to the plane of the original sheet, the finished work hangs downwardly in the manner indicated in Fig. 5. The forward edge of the sheet is advanced into the machine and the first line of slits C formed by a cutting tool which at the same time very slightly stretches the metal lying in advance of the slit C, preferably just enough to produce a slit C of the full length with certainty. In the following operation the slightly stretched portion D is further stretched in the form shown at D' (Fig. 4) while a new line of slightly bent portions D is formed, and a new line of slits C. In the next operation the parts D are again fully stretched to the shape D', being offset by a staggered feed mechanism of any known or suitable type. In stretching the slightly bent portion D to form the sharply or deeply bent portion D', there is a tendency to distort the previous finished line. Consequently I provide for retaining the finished line D' in shape, between a pair of correspondingly shaped dies, simultaneously with the further stretching of the part D. By this division of the work the movement of the compound tool or group of tools may be comparatively slight, a very rapid operation can be secured, and a perfect form for the finished product is insured.

In the machine shown a block E is fastened to the cross-head of the apparatus, or is otherwise reciprocated rapidly up and down. A stationary block F carries a table G which supports the sheet A. A holder H is fastened to a bracket J depending from the block E by means of a pin K working in a slot L in the holder, and is pressed down by a spiral spring M located in a recess in the block E. This holder, or a number of such holders arranged along the line of work, engages the plate A and holds it down upon the fixed cutter N before the movable tools strike the work.

The movable dies include a series of cutting dies O, forming or stretching dies P, and retaining dies Q, which are fastened adjacent to each other in the manner shown by means of bolts R passing through a depending flange of the block E. In line with these are the fixed dies S, T and U fastened by a bolt V to an upward extension of the lower block F. The shapes of the several dies are indicated in the face elevations of Fig. 6.

No claim is made herein to the method, the same being claimed in my divisional application No. 475,549, filed February 2, 1909.

What I claim is:—

1. A machine of the class described including in combination a cutter and a separate intermittently operating stretcher, said cutter and stretcher being arranged to operate on the metal simultaneously at successive points.

2. A machine of the class described including in combination, a reciprocating cutter, a separate stretcher adjacent to and reciprocating with said cutter, said cutter and said stretcher acting in a direction transverse to the plane of the sheet, and operating on the sheet simultaneously at successive points.

3. A machine of the class described including in combination means for forming a line of meshes and means for retaining a line of finished meshes in shape while forming the following line, so as to avoid deforming the finished line by the forming of the following line.

4. A machine of the class described including in combination a cutter, a stretcher, and a retainer for retaining the stretched metal in shape, said retainer being arranged to operate upon the line of meshes immediately in advance of the stretcher, so as to avoid deforming said advance line by the stretching of the following line.

5. A machine of the class described including in combination, a reciprocating cutter, a separate stretcher adjacent to and reciprocating with said cutter, and a separate retainer adjacent to and reciprocating with said stretcher, said cutter, stretcher and retainer acting in a direction transverse to the plane of the sheet and operating simultaneously at successive points, said retainer retaining a line of finished meshes in shape so as to avoid the deforming of it by the stretching of the following line.

6. A machine of the class described including in combination a cutter O, a stretcher P, and a reciprocating block E upon which said cutter and stretcher are fastened in juxtaposition.

7. A machine of the class described including in combination a retainer consisting of a pair of dies Q and U adapted to clamp between them the finished line of the meshes, and means actuated simultaneously with said retainer for forming the next line of meshes.

8. A machine of the class described including in combination a cutting die O, a forming or stretching die P, and a retaining die Q reciprocating together, and fixed dies S, T and U in position to coact with said dies O, P and Q.

In witness whereof, I have hereunto signed my name in the presence of two subscribing witnesses.

WILLIAM KLOCKE.

Witnesses:
 Domingo A. Usina,
 Theodore T. Snell.